United States Patent

Sey et al.

[11] Patent Number: 5,878,482
[45] Date of Patent: Mar. 9, 1999

[54] METHOD FOR THE MANUFACTURE OF A DEGAUSSING COIL

[75] Inventors: Jean-Claude Sey; Daniel Vittoz, both of Auxonne; Christophe Lanaud, Dole, all of France

[73] Assignee: Thomson Television Components France, Courbevoie, France

[21] Appl. No.: 987,614

[22] Filed: Dec. 9, 1997

Related U.S. Application Data

[62] Division of Ser. No. 705,065, Aug. 29, 1996, Pat. No. 5,751,206, which is a continuation of Ser. No. 206,626, Mar. 7, 1994, abandoned.

[30] Foreign Application Priority Data

Mar. 12, 1993 [FR] France .................................. 93 02870

[51] Int. Cl.$^6$ ....................................................... H01F 41/12
[52] U.S. Cl. ........................ 29/605; 264/272.19; 336/192
[58] Field of Search ............................ 29/605, 854–856; 336/192, 205, 209, 229; 264/272.19

[56] References Cited

U.S. PATENT DOCUMENTS

| 4,847,557 | 7/1989 | Saito et al. ................................. 336/96 |
| 5,111,175 | 5/1992 | Sugiura et al. .......................... 336/192 |
| 5,175,525 | 12/1992 | Smith ......................................... 336/96 |
| 5,423,117 | 6/1995 | Okada et al. .............................. 29/605 |

FOREIGN PATENT DOCUMENTS 0 488 461  6/1992  European Pat. Off. .

Primary Examiner—Carl E. Hall
Attorney, Agent, or Firm—Oblon, Spivak, McClelland, Maier & Neustadt, P.C.

[57] ABSTRACT

A method of manufacturing degaussing coils designed to be mounted on the glass panels of cathode-ray tubes used to display color therein, the link between the ends of the winding of the degaussing coil and the conductors providing connection to the electrical supply circuit is encased by the injection, into a mold, of an insulating thermoplastic material. The method can be applied to degaussing coils for color television receivers.

10 Claims, 3 Drawing Sheets

METHOD FOR THE MANUFACTURE OF A DEGAUSSING COIL

This application is a Division of application Ser. No. 08/705,065, filed Aug. 29, 1996, now U.S. Pat. No. 5,751, 206, which is a Continuation of Ser. No. 08/206,626, filed on Mar. 7, 1994, now abandoned.

BACKGROUND OF THE INVENTION

1. Field of the Invention

The invention relates to degaussing coils or degaussers designed to be fitted into cathode-ray tubes for color televisions. The degaussing coil is constituted by a winding of enamelled electrical wire shielded by a heat-sealed insulator sheath. This wire is fastened to the glass fixtures of the mask picture tube and it is connected to the electrical circuit of the television set by a pair of conductors that end in a bipolar connector. The conductors are electrically connected to the two ends of the winding in a region that is not covered by the insulator sheath. This uncovered region is then confined in an insulating envelope that ensures the electrical shielding and the mechanical strength of the connected parts. The envelope can be formed by taping or by two shells of synthetic organic resin forming an interconnection case.

2. Discussion of the Background

Coils manufactured according to taping techniques or by the positioning of a case require equipment whose difficulty of handling entail considerable extra costs. These coils may have a defect in the sealing quality at the interconnection and they lack aesthetic quality.

SUMMARY OF THE INVENTION

To overcome the above-mentioned drawbacks, the method according to the present invention uses a thermoplastic injection molding technique that replaces the interconnection case by producing a gusset or sleeve shape that is an efficient electrical insulator and furthermore provides a mechanical link between the coil itself and the insulated cabling wires that connect it to the circuit of the television set or the video monitor.

An object of the invention is to provide a method for the manufacture of degaussing coils comprising a step of making a winding surrounded by a tubular insulator sheath on almost its entire perimeter, the ends of the winding emerging into the uncovered zone, a step of connecting, to these strip ends, two insulated electrical conductors designed for the electrical connection of the coil and a step consisting of encasing said zone with an appropriate electrical insulating element, wherein the connection step uses, as a connection element, a bifilary or two-wire cable whose electrical insulator comprises a spacer connecting the sheathings of the conductors to one another and wherein the next step consists of the over-molding of a casing by the hot melt injection, into a mold, of a thermoplastic insulating material.

An object of the invention is also to provide a degaussing coil comprising a winding confined on almost its entire circumference in a tubular insulating sheath, a connection by means of two insulated electrical conductors, made at the ends of said winding, and an insulator casing to conceal the connection and the uncovered zone of the winding by capping the ends of said sheath, wherein the connection is done by means of a bifilary cable whose electrical insulator comprises a spacer connecting the sheathings of the conductors to one another and wherein said casing consists of an over-molding of thermoplastic insulating material.

BRIEF DESCRIPTION OF THE DRAWINGS

The invention will be understood more clearly from the following description and from the appended drawings, of which.

In the following description, the same elements are designated by the same references.

DETAILED DESCRIPTION OF THE PREFERRED EMBODIMENTS

Figure 1:
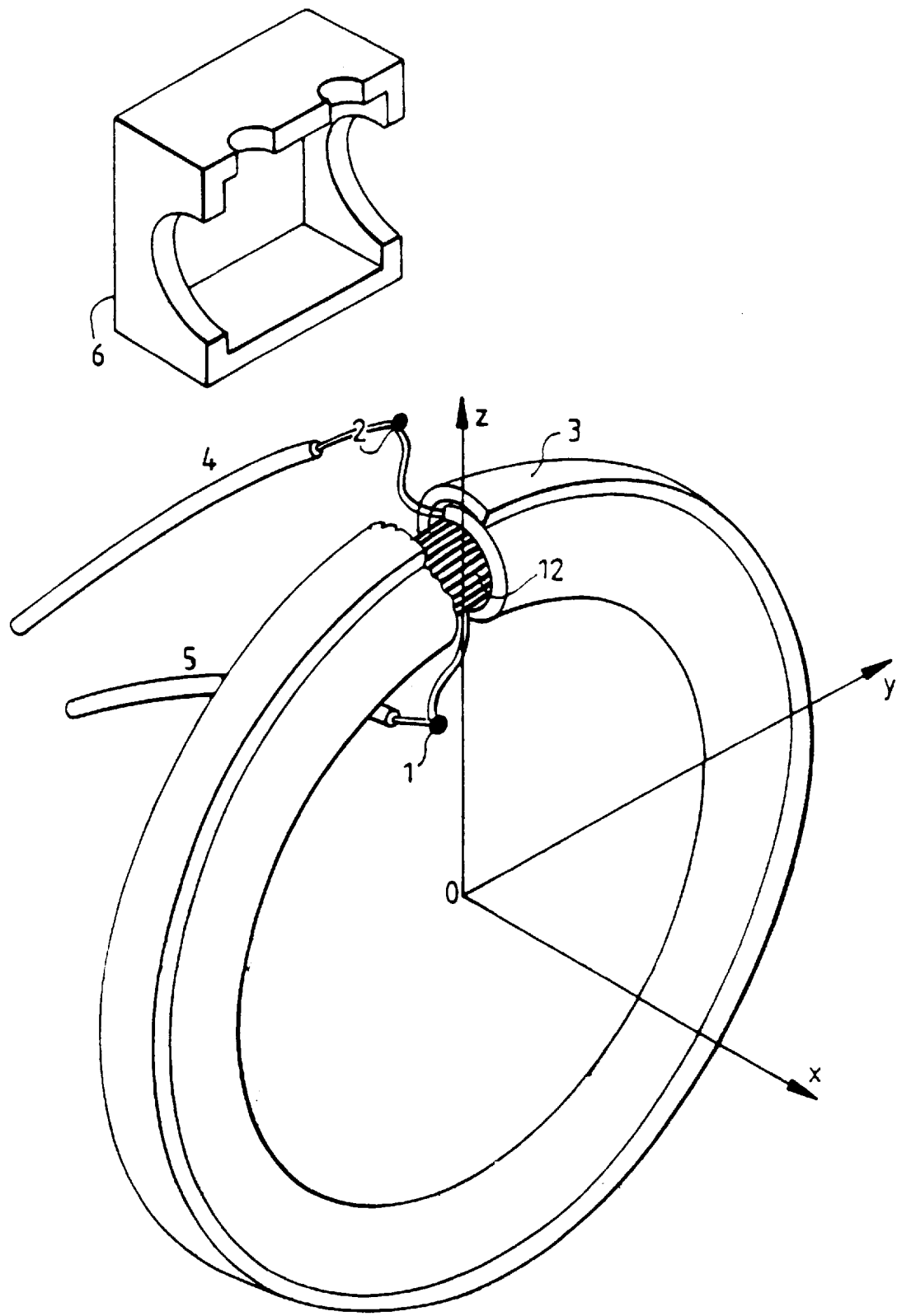
FIG. 1 is an isometric view of a known type of degaussing coil.

FIG. 1 shows a degaussing coil in the process of being manufactured. The chief element is a winding 12 made of enamelled wire having two ends 1 and 2 that end in an uncovered zone. A tubular insulating sheath 3 confines the winding 12, except for the uncovered zone which can be seen in FIG. 1, in the direction of the axis OZ. The axis OX is the winding axis of the winding 12 and the other axes define a plane of symmetry YOZ of the winding. In FIG. 1, the cross-section of the sheath 3 has been greatly exaggerated with respect to its perimeter in order to highlight the structural details. In practice, the diameter of the sheath 3 may be equal to 9 mm while the diameter of the winding may vary from 300 to 1000 mm. As a non-restrictive example, the sheath 3 is made of strip of heat-sealing plastic material that has been incurvated to obtain a toroidal shape with an overlapping of the strip longitudinal edges which are then heat-sealed.

To make a current flow in the winding 12, it is planned to have an electrical connection by means of two insulated conductive wires 4 and 5 which are connected to the ends 1 and 2 of the winding 12 by soft soldering or with self-stripping crimping lugs. To encase the electrical connections in an uncovered zone of the winding and cap the ends of the sheath 3, it is possible to make use of an insulating case 6. Half a case such as this is shown in FIG. 1. Two holes are designed to grip the sheath 3 and two additional smaller holes serve as passages for the conductors 4 and 5. Within the half-case 6, there may be provided electrical interconnection means and means to hold the sheath and the conductors. Apart from its relatively high cost, this type of coil is not imperviously sealed, whence the possibility exists of corrosion of the bared parts of the electrical circuit.

According to the invention, to form a casing around the connection elements and the uncovered part of the winding and in order to make the casing cap the ends of the sheath, a thermoplastic injection technique is proposed. The material to be injected into a two-part mold is chosen for its qualities of electrical insulation, its qualities of adhesion to the PVC material out of which the sheath 3 is made and its high fluidity at the injection temperature. As a non-restrictive example, the material used is a bonder based on copolyamide resin such as is used in the so-called HOT MELT injection method. This resin is, for example, a thermo-melting pure copolyamide resin having a density of 0.98, a softening point of 129° to 140° C. (AFNOR standard No. T76106) and a Brookfield viscosity value of 2.5 to 4.0 Pa.s.at 190° C. This resin, which plays the role of a bonder, is taken to a temperature of 180° C. to 210° C. in order to be injected into a mold under a pressure of some bars. Certain materials used for high-pressure injection are not appropriate since high-pressure injection may damage the strand of enamelled wire and fold the terminations of the conductors. They may then get short-circuited or come too close to the walls of the mold, and this would give rise to defective electrical insulation. It must be recalled that the insulation quality required of a degaussing coil is high owing to the presence of very high voltages in the cathode-ray tube.

The making of the connection by means of two insulated flexible conductors raises a problem in that the parts to be coated have to be held in position. According to the invention, the element chosen to set up this connection is an insulated bifilary or two-wire cable having two parallel electrical conductors whose sheathings are connected to one another by a spacer, that is flat, for example, and keeps a constant spacing between them. The spacer and the sheathings are obtained by a single extrusion operation according to the method used to manufacture the symmetrical lines used for the transmission of the VHF and UHF signals. Advantageously, a cable with dual insulation is opted for. This means that the manufacturing method starts with two solid conductors insulated by a first tubular sheath and that an insulator strip is then extruded to coat the first sheaths and form the spacer mentioned here above.

Figure 2:
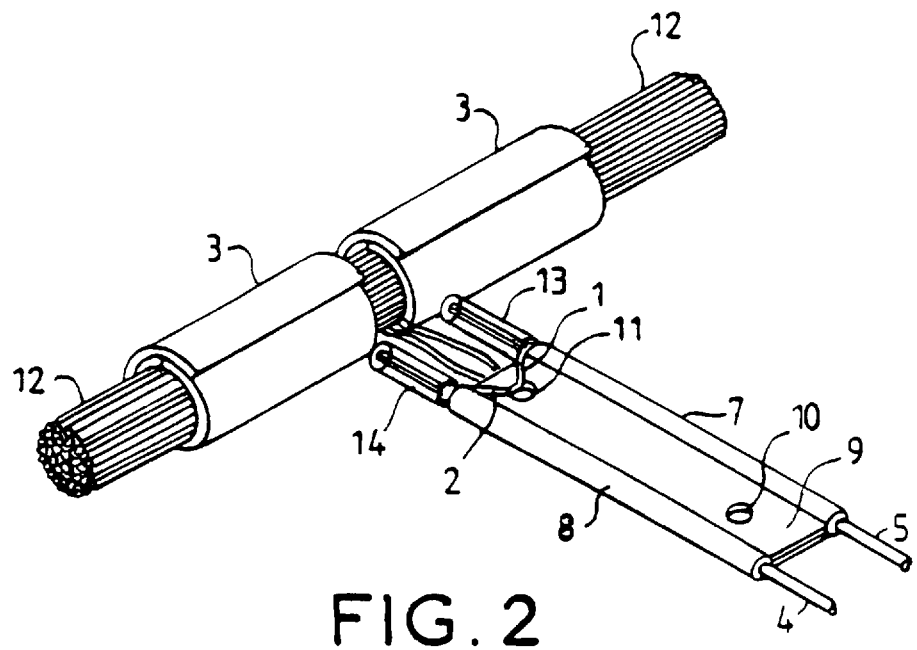
FIG. 2 is an isometric view of a coil according to the invention, during manufacture.

FIG. 2 shows a part of the degaussing coil in the zone in which the winding 12 is not covered with an insulating sheath 3. The figure also shows the bifilary cable member 9 formed of an insulating thermal plastic material which is shown perpendicularly to the winding 12 after its two one-strand conductors 4 and 5 have been stripped. The ends 1 and 2 of the winding are made to go through a hole 11 punched in the spacer of the cable 9, in order to fold them towards the winding 12 and make them go along the two conductors 4 and 5 in their bared part. Self-stripping crimping lugs or connection 13 and 14 are threaded and clamped so as to set up a clear electrical contact between the winding 12 and the conductors 4 and 5. The lugs 13 and 14 are contiguous to the sheathings 7 and 8 of the cable 9. This tends to hold them in the zone forming the extension of these sheathings. The folding of the enamelled wire of the winding keeps the lugs 13 and 14 quite close to the sheath 3, the distance between the ends of this sheath 3 being shorter than the spacing between the lugs 13 and 14. To obtain this result, the coil and the connection cable are held in supports forming an assembling template which is not illustrated in FIG. 2. As shown in FIG. 2, wires 4,5 are respectively longitudinally aligned with crimping lugs on conections 13,14.

The device illustrated in FIG. 2 can be coated in a single step, but it is preferable to do so in two steps to improve the precision of the positioning of the elements to be coated with thermoplastic material.

Figure 3:
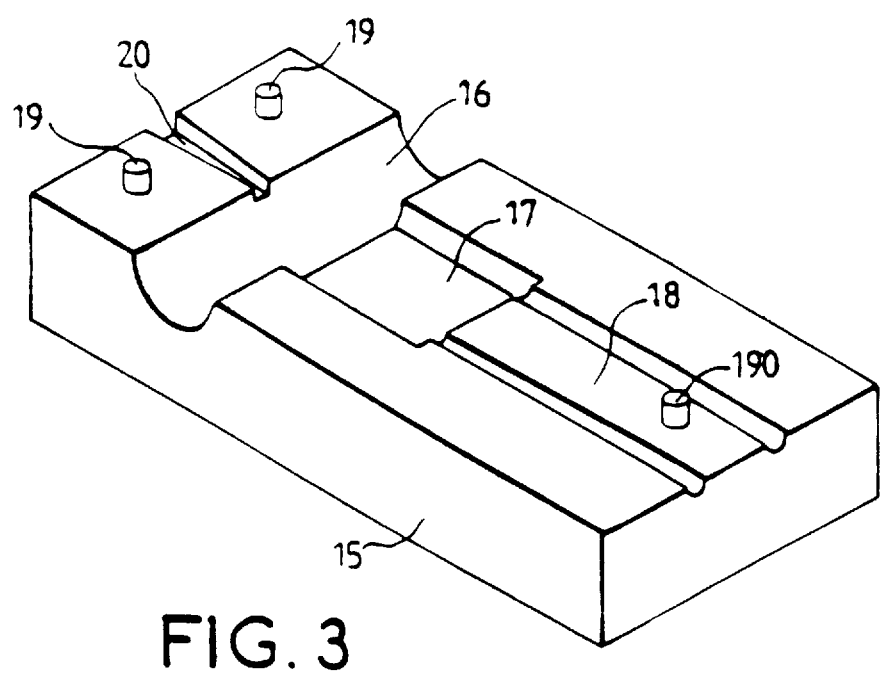
FIG. 3 is an isometric view of a half-mold used for hot premolding.

FIG. 3 shows a half-mold shell 15 that can be used to carry out a precoating of the structure shown in FIG. 2. This precoating bears reference number 22 in FIG. 4. It exactly fills the vacant portion between the ends of the sheath 3 without going beyond the diameter; it completely coats the crimping lugs 13 and 14 and it coats the non-stripped end of the cable 9 on the winding 12 side. Thus reinforced, the coil structure of FIG. 4 may undergo the final over-molding. Returning to FIG. 3, it can be seen that the precoating mold has two shells 15 that are fitted into each other by means of centering pins 19 and 190. The features to be noted are a semi-cylindrical housing 16 for the sheath 3, a housing 18 in which the cable 9 is embedded at mid-height and a cavity 17 which will give rise to the part of the pre-coating that extends between the sheath and the visible part of the cable 9 (see FIG. 4). To ensure that the cable 9 is accurately positioned with respect to the sheath 3, the pin 190 goes through a hole 10 of the cable 9. The holes 10 and 11 are created by the machine used to strip the end of the cable 9. The shells 15 of the precoating mold frame the structure of FIG. 2 by the top and the bottom. When the mold is closed, the thermoplastic material is injected through the nozzle 20 which occupies a position opposite to the cable with respect to the sheath 3. If the lugs 13 and 14 are very close to the walls of the mold, at worst they may be flush with the surface but since, subsequently, an over-molding is carried out, it is certain that the insulator thicknesses will be as required. When the material has been injected, it solidifies and the mold can be opened by retracting the two shells 15. The precoating of the crimping lugs may have a height equal to the diameter of the lugs, and there is no drawback entailed in the fact that bringing the two parts of the mold closer together brings about a precise realignment of the lugs. Indeed, the insulator thicknesses required will be obtained during the final over-molding. Injection in two successive stages is a particularly advantageous approach.

The HOT MELT method referred to here above uses a generator of molten material that comprises a two-stage container. The two stages respectively carry out the preheating and the heating of the material to be injected. The container feeds a pump which sends on the heated material through a conveying tube to an injection gun that is applied to the injection nozzle 20 of the mold. The liquid material is propelled up to the valve of the gun under pressure of some bars. The timing control of the valve of the gun determines the quantity of material injected into the mold. Thus, three parameters are controlled: these are the pressure, the temperature and the injection time. The precoating gives rise to a structure that is imperviously sealed and highly rigid but is not robust enough for the use envisaged and does not give the requisite insulator thicknesses.

Figure 4:
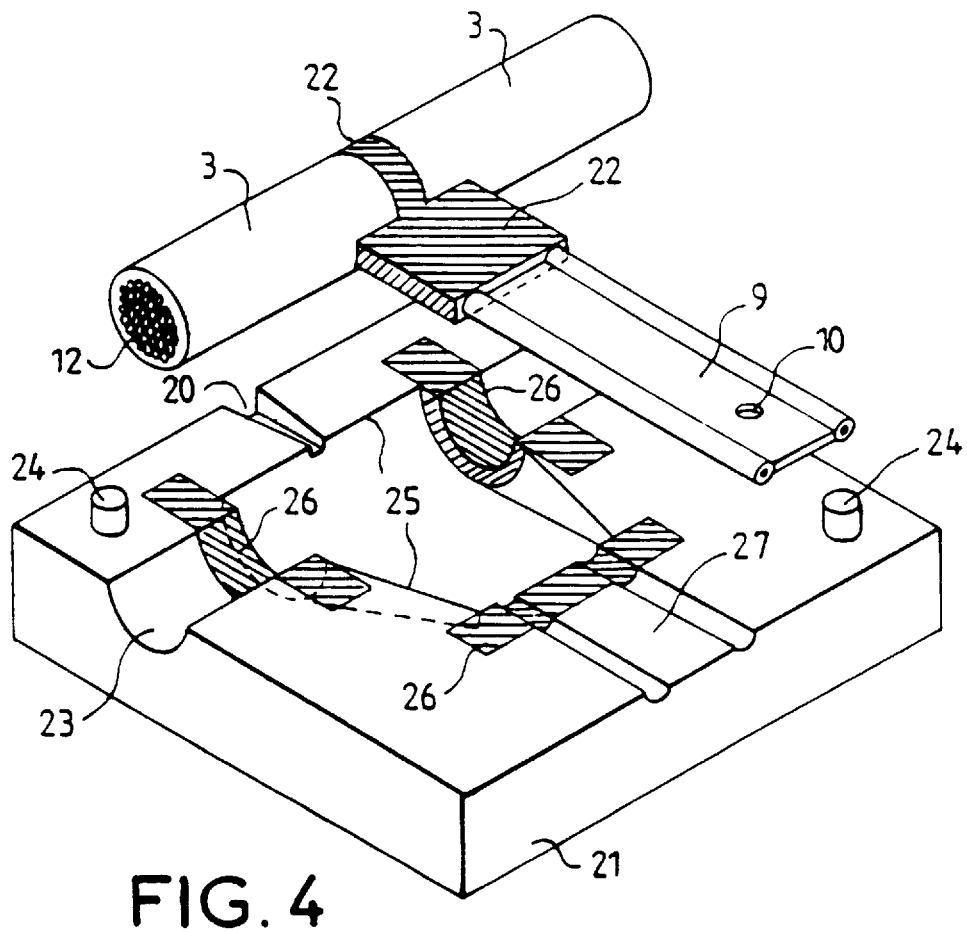
FIG. 4 is an isometric view showing the intermediate product obtained when it is removed from the mold of FIG. 3, and the structure of a half-mold used for the final over-molding.
Figure 5:
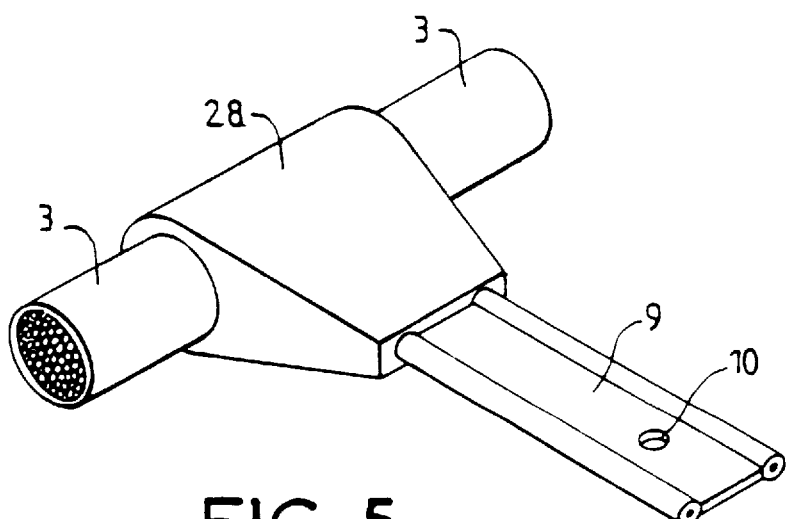
FIG. 5 shows a part of the degaussing coil according to the invention.

What has to be done now is to go to the final stage of the method which consists of the over-molding, with a thermoplastic material, of a structure with greater encasing quality, namely a structure of the gusset, T-connection or sleeve with lateral tap type. As a non-restrictive example, FIG. 5 illustrates a gusset-shaped over-molding 28. To achieve this particular shape, the invention uses two half-molds 21 as illustrated in FIG. 4.

The half-mold 21 has semicircular holes 23 designed to receive the sheath 3, a hollow part 27 that matches the shape of the cable 9 so that it gets half embedded therein and a half cavity 29 that gives the gusset 28 its external shape. To prevent leaks of injected material, the invention provides for half O-ring seals 26 which are embedded in the half-mold close to the three outlet holes. These seals are constituted by parts made of elastomer material resistant to the injection temperature. Pins 24 used to center the two parts of the mold and an injection nozzle 20 can also be seen in the figure. The injected material may be the same as the one used for a precoating operation, but it is also possible to choose another material for the over-molding, for the precoated material is more resistant to the strains that may be induced by the final injection.

The manufacturing method that has just been described reduce manpower requirements, and the raw material needed is reasonably priced. Furthermore, it provides good adhesion of the over-molding to the sheath without any gripping force, and the product obtained is imperviously sealed. Moreover, the finish is aesthetically pleasing, which is no disadvantage.

The invention is not limited to the examples described. Its scope extends to alternative embodiments as regards the shape of the sheath, the bifilary cable and the shape given to the precoating and to the final over-molding. The final over-molding makes it possible to emboss the references of the degaussing coil and its certification marks.

What is claimed is:

1. A method for manufacture of degaussing coils, comprising:
    providing a winding surrounded by a tubular insulator sheath on substantially an entire perimeter portion thereof, with ends of the winding emerging into an uncovered zone thereof
    connecting to said ends of said winding two insulated electrical conductors for electrical connection of the coil;
    encasing said zone with an electrical insulating element, wherein the connecting of said conductors to said ends of said winding includes using, as a connection element, a bifilary cable having an electrical insulator which comprises a spacer connecting the sheathings of the conductors to one another; and
    over-molding a casing over said conductors and said ends of said winding by hot melt injection, into a mold, of a thermoplastic insulating material.

2. A method according to claim 1 which comprises, precoating, prior to the over-molding of said conductors and said ends of said winding, the uncovered zone by hot melt injection into a mold.

3. A method according to either claims 1 or 2, which comprises forming said spacer so as to be flat, punching a hole in the spacer, positioning ends of said winding into the hole and folding said ends of said winding therein.

4. A method according to either claims 1 or 2, which comprises positioning the parts to be encased by injection using a hole punched in the spacer of said bifilary cable.

5. A method according to claims 1 or 2, the conductors having ends, respectfully, wherein the connecting of said conductors and said ends of the winding comprises soldering, with a filler metal, the ends of the winding to the ends of the conductors.

6. A method according to either claim 1 or claim 2, wherein the connecting of said conductors and ends of said winding comprises connecting the ends of said winding to the ends of the conductors of said bifilary cable with a pair of crimping lugs.

7. A method according to either claim 1 or claim 2, wherein the electrical conductors of said bifilary cable comprise single-strand conductors.

8. A method according to claims 1 or 2, wherein the over-molding over said conductors and said ends of said winding comprises using a two-part mold having an injection nozzle that is pointed towards said winding and is located opposite said bifilary cable with respect to the winding.

9. A method according to claims 1 or 2, wherein said thermoplastic insulating material comprises a copolyamide resin.

10. A method according to claim 9, wherein said sheath and an external insulator of said bifilary cable comprises PVC.

* * * * *